United States Patent [19]

Hunter

[11] 4,429,895

[45] Feb. 7, 1984

[54] ADJUSTABLE TRAILER HITCH ASSEMBLY

[76] Inventor: Ronald W. Hunter, 7280 Nevada La., Colorado Springs, Colo. 80908

[21] Appl. No.: 312,861

[22] Filed: Oct. 19, 1981

[51] Int. Cl.³ .............................................. B60D 1/06
[52] U.S. Cl. ............................................... 280/490 R
[58] Field of Search .................................... 280/490 R

[56] References Cited

U.S. PATENT DOCUMENTS

| 3,035,856 | 5/1962 | Mleczko et al. | 280/490 R |
| 3,984,121 | 10/1976 | Dobosi | 280/490 R |
| 4,248,451 | 2/1981 | Usinger | 280/490 R |
| 4,266,799 | 5/1981 | Wood | 280/490 R |

FOREIGN PATENT DOCUMENTS 7768 of 1927 Australia .......................... 280/490 R Primary Examiner—Joseph F. Peters, Jr.
Assistant Examiner—Kenneth R. Rice

[57] ABSTRACT

An adjustable trailer hitch assembly, including a vertical sleeve affixed on a trailer tongue, a tubing adjustably slideable in the sleeve, and a ball hitch supported on the tubing.

1 Claim, 8 Drawing Figures

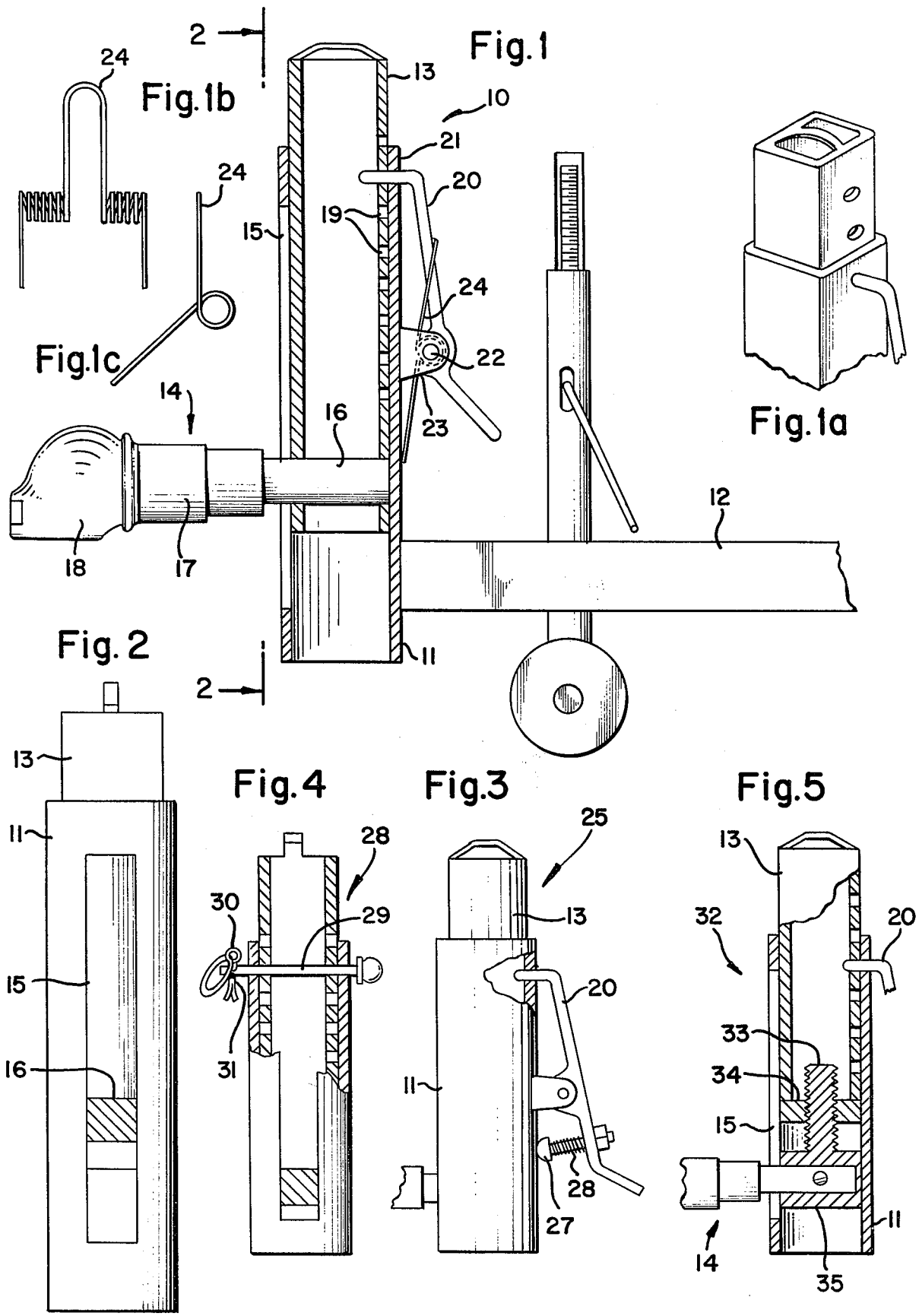

ADJUSTABLE TRAILER HITCH ASSEMBLY

This invention relates generally to trailer hitches.

It is well known to some persons who have had the experience of towing a trailer behind a vehicle, and using a conventional trailer hitch, that the trailer may possibly be tilted either forwardly or rearwardly, instead of being horizontally level. Such a tilt, added to the tilt of the trailer when traveling up or down a hill, can be too excessive for keeping some objects inside the trailer from toppling over. Also, such a tilt can contribute to instability of the trailer as it travels along a road. This situation is objectionable, and is, therefore, in need of an improvement.

Therefore, it is a principal object of the present invention to provide a trailer hitch which is adjustable in height, so that the trailer can normally be in a horizontally level condition.

Another object is to provide an adjustable trailer hitch, which increases the road stability of the trailer, and improves the ride smoothness of both the towing and towed vehicles, while at the same time, providing less road fatigue for the driver.

Other objects of the present invention are to provide an adjustable trailer hitch assembly, which is simple in design, inexpensive to manufacture, rugged in construction, easy to use and efficient in operation.

These, and other objects, will be readily evident, upon a study of the following specification, and the accompanying drawing, wherein:

FIG. 1 is a side elevational view, partly in cross-section, and showing the invention incorporated with a trailer hitch;

FIG. 1a is a fragmentary perspective view, showing that the device is made from square tubings;

FIG. 1b is a side elevational view of a torque spring used in the construction of the device illustrated in FIG. 1;

FIG. 1c is a side elevational view thereof;

FIG. 2 is a cross-sectional view, taken on line 2—2 of FIG. 1;

FIG. 3 is a side elevational view of another design of the invention, which uses a spring-biased stop bolt for retaining a latching of a slideable tubing inside a sleeve;

FIG. 4 is a cross-sectional view, taken in the same plane as FIG. 2, and showing yet another design of the invention, which uses a straight latch pin for locking the tubing to the sleeve, and FIG. 5 is a side cross-sectional view of yet another design of the invention, which includes a fine adjustment between the tubing and sleeve.

Referring now to the drawing in greater detail, and more particularly to FIGS. 1 through 2 thereof, at this time, the reference numeral 10 represents an adjustable trailer hitch assembly, according to the present invention, wherein there is a preferably square sleeve 11, secured rigidly in a vertical position on a forward end of a trailer tongue 12. A correspondingly same-shaped tubing 13 is installed inside the sleeve, and includes a forwardly extending ball hitch arm 14 rigidly secured thereto, and which protrudes out of a vertical slot 15 formed on the sleeve.

The ball hitch arm includes a square tubing 16, affixed to the tubing 13, a metal wrap between an end of tubing 16 and a slip collar 17 on which a ball hitch 18 is carried, for connection to a towing vehicle.

The tubing 13 is slideable inside the sleeve, so that the ball hitch, supported thereby, may be vertically adjustable. The tubing 13, accordingly, includes a row of holes 19, which are selectively engagable by an end of a latch bolt 20 protruding inwardly through a hole 21 in the sleeve. The latch bolt is pivotable about a pin 22 of a bracket 23, secured to an outer side of the sleeve. A torque spring 24 urges the latch bolt in a direction so that the bolt engages a selected hole 19.

The adjustable trailer hitch assembly 25, shown in FIG. 3, is the same as the design 10, except that the above described torque spring 24 is substituted by a compression coil spring 26 around a bolt 27, slideable through an opposite handle end of the latch bolt; the bolt 26 bearing against the side of the sleeve.

The design 28 of the invention, shown in FIG. 4, is likewise the same in construction as the design 10, except that, instead of the above described pivotable latch bolt 20, a headed, straight latch pin 29 is used, and is secured from accidentally falling out by means of a cotter pin 30 on a snap ring; the cotter pin fitting through a cross hole 31 near one end of the pin.

Still another design 32 of the invention, shown in FIG. 5, includes the feature of a fine adjustment for the distance between the holes 19. In this design, the ball hitch arm 14 is secured to screw 33, that is screw adjustable in threaded hole 34 of a plate welded on an end of the tubing 13, so that, by simply raising the tubing momentarily completely out of a top of the sleeve, the tubing may thus be twisted on the screw a selected distance before re-insertion. The screw head 35 is square-shaped so as to fit the inside of the sleeve slideably.

It is to be understood that this invention is not limited only to square sleeves and tubes, but may be also adaptable for round sleeves and tubes, as suggested.

While various changes may be made in the detail construction, it is understood that such changes will be within the spirit and scope of the present invention, as is defined by the appended claims.

What I now claim is:

1. An adjustable trailer hitch assembly, comprising, in combination, a cross-sectionally square sleeve secured fixedly in vertical position on a forward end of a trailer tongue, a correspondingly cross-sectional square tubing adjustably slidable vertically in said sleeve, said tubing carrying a forwardly extending ball hitch arm, for attachment to a towing vehicle, said arm extending through a vertical slot of said sleeve, and means for elevating said ball hitch arm in height for selectively tilting or leveling a towed trailer, said means comprising a coarse adjustment and a fine adjustment, said coarse adjustment comprising a latch bolt supported on said sleeve engaging a selected one of a vertical row of holes on said tubing, and said fine adjustment comprising a threaded opening through a bottom plate affixed to a lower end of said tubing, and an upwardly extending screw for adjustable engagement in said threaded opening, said screw being secured to said ball hitch arm, and being longer than a distance between an upper edge of said sleeve and an upper edge of said slot, so that said engagement is accomplished when said square tubing is slid upwardly outside said sleeve for rotation relative to said screw.

* * * * *